INVENTOR
WALTER F. ANDERSON
BY Robert C. Sullivan
ATTORNEY

WALTER F. ANDERSON
BY *Robert C. Sullivan*
ATTORNEY

United States Patent Office 3,342,998
Patented Sept. 19, 1967

3,342,998
SPRING-DRIVEN ELECTRICAL GENERATOR
Walter F. Anderson, Lancaster, Pa., assignor to Fidelity Electric Company, Inc., Lancaster, Pa., a corporation of Pennsylvania
Filed Apr. 1, 1965, Ser. No. 444,629
20 Claims. (Cl. 290—1)

This invention relates to spring-driven electrical generators and more particularly to spring-driven generators of the type having a short duration electrical output such as, for example, electrical generators suitable for use in detonating explosives in blasting operations, or for detonating purposes in certain military applications.

Throughout the specifications, the spring-driven electrical generator of the invention will be described as embodied in an electrical generator whose short duration electrical output is used for detonating purposes. However, it will be understood that the spring-driven generator of the invention may be used for other purposes and in other types of applications or environments.

In the prior art, electrical generators for use as detonating devices in blasting operations or the like have frequently been manually driven through a gearing system which is caused to turn by a manual force applied by the human operator of the device. However, one serious objection to use of manual drive means for such detonating generators is the fact that the amount of force applied by different operators may vary widely with the result that the electrical output of the detonating generator may vary over a wide range depending upon the particular operator by whom the manual operating force is applied. Hence, the use of manually operated detonating generators is not suitable where it is necessary that the electrical output of the detonating generator be of a definitely predictable value.

It has also been known in the prior art to employ helical springs for driving short duration output or detonation generators. However, helical springs are unsatisfactory for a number of important reasons. First, such helical springs used in prior art generators do not have constant output force but instead have a variable force as they unwind. Furthermore, helical springs have the disadvantage that when they are initially released from their wound-up condition to cause rotation of the generator, they produce a large undesirable starting impact which frequently results in breakage of components of the apparatus. It may be possible to design a generator driven by a helical spring to avoid such breakage due to impact by suitably increasing the size and strength of the components to overcome the impact at starting, with resulting increase in size and cost of the machine.

A further disadvantage of the use of helical springs as a prime mover for detonation generators or the like is the fact that if the springs is wound up for any substantial length of time in advance of use, it will develop a "set" which adversely affects the power output characteristic of the spring. Also, helical springs, being anchored at both ends thereof, are adversely affected by extremes in temperature and the dimensional changes caused by expansion or contraction of the helical springs may cause fracture of the spring.

Still a further disadvantage of helical springs is the fact that they begin to deteriorate mechanically after the first use thereof, and with continued usage there is a gradual and continuous deterioration of the helical spring which adversely affects its power output. This deterioration of the helical spring causes the power output and time characteristics of the spring to be unpredictable for any given operation of the spring, which renders the spring unsatisfactory for use where these characteristics must be definitely predictable.

Short duration output electrical generators may be categorized into two different groups with respect to their electrical characteristics as follows: (1) "Permissible" generators; and (2) "Non-permissible" generators.

"Permissible" generators are usually provided with suitable switch means, usually operated by a cam or the equivalent thereof, which controls the length of time during which the output circuit of the generator is closed as, for example, a period from 10 to 30 milliseconds. In blasting operations in mines, "permissible" generators are always required since, if the electrical output of the generator remains connected to the igniting device after the blast occurs, there is danger that explosive gases present in the mine or the like may be ignited by the electrical output of the generator. Thus, "permissible" generators should have output switch means whose opening is accurately timed to occur a predetermined time after the output switch has closed. The United States Bureau of Mines has established certain requirements as to the length of time which the output circuits of blasting generators may be closed.

"Non-permissible" generators are not provided with a timed interruption of the output circuit of the generator, with the result that there is no cut-off of the electrical output of the generator to its load, and current continues to flow in the output circuit as long as the generator keeps turning.

Hand-operated generators or spring-operated generators of the prior art have been generally unsatisfactory when used as "permissible" generators since, while hand or spring-operated generators may be provided with a cam-operated switch means which opens the output circuit of the generator after an interval of rotation of the generator, due to the variable speed characteristics of the prior art hand or manually-operated generators and spring-driven generators, the period of time required for the cam to open the output circuit of the generator varies due to the variable speed characteristics of such generators, as previously described. Hence, with prior art hand-operated or spring-operated generators the length of time that the output circuit is connected to the igniting device is a variable factor. As previously explained, if the output circuit of the detonating generator is connected longer than a predetermined time to the igniting device, it may result in ignition of gases in the mine or other location.

"Non-permissible" generators are not suitable for use in blasting operations in any environment in which explosive gases or dust are present, since the "non-permissible" generators are not provided with means for interrupting the output circuit of the generator after a timed interval.

Accordingly, it is an object of the invention to provide a spring-driven generator assembly which represents an improvement over prior art electrical generator assemblies of the short duration electrical output type.

It is another object of the invention to provide a spring-driven short duration electrical output or detonation generator which provides a definitely predictable electrical output over a long operating life.

It is another object of the invention to provide a spring-driven electrical generator in which the drive spring is subject to a minimum of deterioration with the passage of time and with continued use, which deterioration adversely affects the power output of the spring, and in which the drive spring provides a substantially uniform power output characteristic over a long operating life.

It is another object of the invention to provide a spring-driven electrical generator in which the drive spring is much less likely to be subject to mechanical failure than the drive springs of prior art generators.

It is a further object of the invention to provide a spring-driven electrical generator in which the drive spring provides a substantially constant output torque during the short duration power output of the drive spring on each cycle of operation of the spring.

It is a further object of the invention to provide a short duration electrical output generator which is independent of the manual force exerted by different operators.

It is a further object of the invention to provide a spring-driven electrical generator which is so constructed as to eliminate the hammer-like starting impact frequently associated with prior art spring-driven generators which often results in breakage of components of the generator apparatus.

It is a further object of the invention to provide a spring-driven electrical generator in which the spring may be wound up for a substantial length of time before use of the generator, without the spring developing a "set" which adversely affects the power output characteristics of the spring and of the generator.

It is a further object of the invention to provide a spring-driven electrical generator in which the operating characteristics of the spring are not adversely affected by extremes in temparature.

Still a further object of the invention is to provide a spring-driven short duration output electrical generator in which the drive spring is more compact for a given power rating than drive springs of prior art generators of the short duration electrical output type.

Still a further object of the invention is to provide a detonation generator which will interrupt its own output circuit at the end of a definitely predetermined time interval and thereby satisfy the requirements for a "permissible" detonation generator for use in certain types of blasting operations.

It is another object of the invention to provide a spring-driven electrical generator in which the various components of the apparatus including the drive spring, the gear housing, and the electric generator armature and field are so interrelated as to provide an assembly which is more compact than spring-driven generator assemblies of the prior art.

It is still a further object of the invention to provide a spring-driven generator including a spring which is so constructed that failure of a portion thereof will not disable the machine.

Still a further object of the invention is to provide a spring-driven generator in which the total output power of the spring member may be adjusted at the time of the assembly of the machine by controlling the number of laminations of the spring.

Still a further object of the invention is to provide in combination with a spring-driven generator an overuning clutch means which permits the generator to continue to turn independently of the spring drive after the spring drive has unwound and further motion of the spring drive is prevented by a stop means.

In achievement of these objectives, there is provided in accordance with this invention a spring-driven generator of the short duration electrical output type in which a zero gradient or constant torque spring, whose torque is independent of deflection, serves as the prime mover for the generator. To store energy in the zero gradient constant torque spring, the spring is reversely wound onto a drum in a direction opposite to the direction in which it naturally tends to coil. The drum on which the spring is wound is connected through suitable gearing to the shaft of the electrical generator so that when the spring is released, it drives the shaft of the generator with constant torque. The opposite end of the zero gradient spring is free but is oriented about a storage pin which serves as a guide for the free end of the spring. Suitable stop means are provided for limiting the rotary movement of the winding drum in either a winding or an unwinding direction. A suitable detent means is provided to prevent unwinding of the drive spring until the detent means is intentionally released. A suitable overrunning clutch is provided between the spring-driven drum and the generator to permit the generator to continue rotating after the drive drum has been brought to a stop by engagement with a stop or abutment at the end of the unwinding motion of the drive spring. If the generator is intended for use as a "permissible" generator, a timing cam or the equivalent thereof is provided which interrupts the output circuit of the generator after a definitely predetermined interval of time.

It is also within the scope of the invention to provide a spring-driven generator in which the spring is reversely wound onto a stationary drum by means of a storage pin mounted on a pivotally movable lever, whereby release of the wound-up spring causes pivotal movement of the lever in an unwinding direction which may be transmitted through a suitable gear train to the generator rotor.

Further objects and advantages of the invention will become apparent from the following description taken in conjunction with the accompanying drawings in which.

Referring now to the drawings, there is shown a housing generally indicated at 10 of generally rectangular shape, but having rounded corners, and including a lower housing section generally indicated at 11 and an upper housing section generally indicated at 12. The mating edges of the upper and lower housing sections 11 and 12 are provided with interfitting complementary notches as indicated at 14, whereby the upper housing section may be seated in abutting engagement with the lower housing section. The two housing sections 11 and 12 are secured together by suitable fasteners 15. The entire assembly may be enclosed in a suitable non-magnetic outer casing generally indicated at 16, including casing sections 17 and 18. The upper or top wall 19 of upper housing section 12 is provided with an integral vertical extension 20 which serves as a bearing for a rotatably mounted drum member or storage pin 22 whose function will be described hereinafter. The top wall 19 of upper section 12 is also provided with a second integral upward extension 24 which serves as a bearing for the windup drum generally indicated at 26 of the spring drive assembly. In the preferred embodiment of the invention to be described herein, housing 10 is made of a non-magnetic material such as aluminum, since this permits direct attachment of housing 10 to the magnetic structure of the electrical generator without adverse effect on the magnetic field of the generator.

The portions of housing sections 11 and 12 between the lower wall 32 of lower housing section 11 and the upper wall 19 of upper housing section 12 define a gear casing which receives the components of the speed step-up transmission between the drive spring and the generator, as will be described hereinafter.

In accordance with an important feature of the construction, a spring member generally indicated at 36 of the zero gradient constant torque type comprising one or more spring laminations or laminar leaves 37 of prestressed metal spring strip, such as steel spring strip, each present to a predetermined curvature, is secured at one end thereof as by screws 38, to the outer surface of the wind-up drum 26. The opposite or free end of spring 36 is coiled about the surface of drum 22. The free end of spring 36 is not secured to drum 22, but rather drum 22 serves merely as a restraining means and storage pin to orient and store the free end or unwound portion of the spring. As best seen from an inspection of section line 2—2 of FIG. 1, the central vertical axis pin 22 is offset in the front-to-rear dimension of housing 10 from the central vertical axis of winding drum 26, although the center of the free coil end, from which $R_n$, the free coil natural radius is drawn (FIG. 1) lies substantially on a common left-right axis, with respect to the view of FIG. 1, with the central vertical axis of winding drum 26. The output power of spring 36 is directly proportional to the number of laminations 37. The laminations 37 are attached together only at the common point of attachment to wind-up drum 36 by screws 38 and are free to slidably move relative to each other in the direction of their length (fixed end to free end dimension), except at their point of attachment to wind-up drum 26.

In attaching spring 36 to wind-up drum 26, the outer ends of the coiled spring leaves or laminations 37 are withdrawn from the natural direction in which they tend to coil due to their preset curvature, and are reversely wound onto drum 26. As the spring is reversely wound onto drum 26 during the winding procedure to be hereinafter described, the spring resists withdrawal from its natural coil. The maximum deflection of spring 36 from its completely unwound condition (FIGS. 1 and 3) to its completely wound condition (FIG. 4) should not exceed one full revolution of winding drum 26 and preferably should be less than one revolution of drum 26. In the illustrated embodiment, drum 26 may rotate through an angle of approximately 150 degrees, for example, between the fully unwound and fully wound conditions of spring 36. When spring 36 is released from its wound-up condition, it moves in an unwinding direction with a constant force or torque. Spring 36 is substantially shown and described in United States Patent 3,047,280, issued to Charles Pernetta on July 31, 1962. Constant torque zero gradient springs, such as spring 36, are sold under the trademark Neg'ator "RW" by Hunter Spring, a division of Ametek, Inc., of Lansdale, Pa.

Integral extension 20 and storage pin or drum 22 are provided with aligned passages which receive a shaft 28 which has secured thereto a spur gear 30. Shaft 28 is extended to the exterior of the outer casing, where the end thereof is suitably shaped to receive a winding key 39 which may be engaged with shaft 28 when it is desired to wind-up spring 36. The lower end of gear 30 is supported for rotation by a bearing passage in lower wall 32 of lower housing section 11. Spur gear 30 on shaft 28 meshes with a second spur gear 34 of substantially larger diameter than gear 30. Gear 34 is rigidly mounted on a short stub shaft 40 whose upper and lower ends are supported for rotation by a bearing passage in lower wall 32 of lower housing section 11 and in the upper wall 19 of upper housing section 12. A spur gear 42 is loosely mounted on the upper portion of stub shaft 40 above the upper surface of gear 34.

Figures 3, 4, 5, 6, 7, 8:
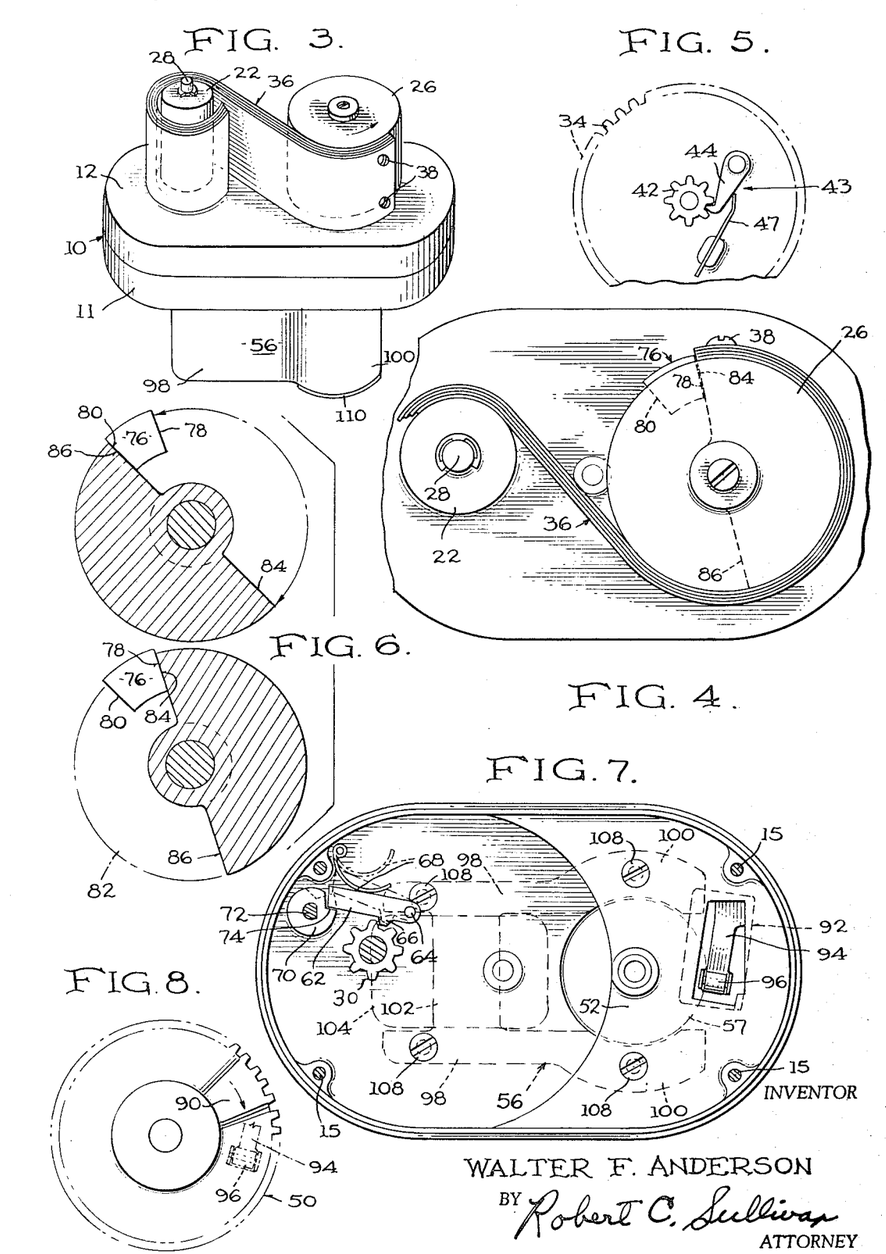
FIG. 3 is a perspective view of the spring-driven electrical generating apparatus of FIGS. 1 and 2 showing the spring drive means in its released or unwound condition.
FIG. 4 is a top plan view similar to FIG. 1, but partially broken away, of the spring-driven generator apparatus with the upper section of the outer casing thereof removed, and showing the drive spring in wound condition.
FIG. 5 is a fragmentary top plan view showing the over-running clutch which permits continued rotation of the generator armature after the drive spring has rotated the winding drum to the limit of its rotation in an unwinding direction.
FIG. 6 is a partially schematic representation of the limiting positions of the winding drum relative to the stationary abutment means which limits the rotation of the winding drum in the unwinding and winding directions, the upper view in FIG. 6 showing the winding drum in its limiting position in the unwinding direction, and the lower view showing the winding drum in its limiting position in a winding direction.
FIG. 7 is a view in section taken substantially along line 7—7 of FIG. 2.
FIG. 8 is a bottom plan view of the switch operating cam, showing the switch in phantom view.

An overrunning clutch, generally indicated at 43, is provided between gears 34 and 42, the clutch comprising a pawl member 44 pivotally mounted about pin 45 on the upper surface of gear 34, as best seen in FIG. 5. The tooth of pawl 44 is biased by a suitable spring, such as leaf spring 47, into engagement with the teeth of gear 42. The operation of overrunning clutch 43 will be described hereinafter.

Shaft 46 which drives wind-up drum 26, is supported for rotation by a bearing 48 mounted in the upper end of housing extension 24, and the portion of shaft 46 which projects above bearing 48 with respect to the view shown in FIG. 2 is of oblong cross section and passes through and is secured rigidly to the upper wall of drum 26, so that drum 26 is rigidly secured to and rotates with shaft 46. The lower end of shaft 46 has a large spur gear 50 secured thereto, gear 50 being in geared engagement with loosely mounted gear 42. The lower housing section 11 is formed with an integral bearing bracket 52 the upper surface of which serves as a bearing for the lower surface of gear 50. Bracket 52 is also provided with an internal bearing passage which receives the end of stub shaft 54 of the armature 57 of the direct current electric generator generally indicated at 56. Stub shaft 54 of armature 57 has mounted thereon a spur gear 58 which is an geared engagement with gear 34.

In an operative embodiment of the invention which has been built, the small diameter gears 30, 42, and 58 each have twelve teeth, and the large diameter gears 34 and 50 each have sixty teeth. In the preferred embodiment of the invention, the gears are made of a suitable non-magnetic material such as brass, a zinc alloy, of a suitable fiber material, or of a suitable plastic material such as nylon, to avoid any adverse effect on the magnetic field of the generator where housing 10 is directly attached to the magnetic structure of the generator.

In order to prevent unintentional release of spring 36 when wound, a detent mechanism as seen in FIG. 7 is provided comprising a lever member 62 pivoted about point 64 and having a tooth 66 thereon which engages in the space between the teeth of gear 30. A spring 68 normally biases lever 62 and tooth 66 into locking engagement with respect to gear 30 to prevent rotation of gear 30. When gear 30 is restrained against rotation, drum 26 is prevented from rotating in an unwinding direction due to the fact that the gear train interposed between gear 30 and drum 26 is also locked against rotation.

A cam member 70 fixed to a rotatable pin 72 is provided with a cut-away portion 74 upon which the outer end of lever 62 normally rests when lever 62 and tooth 66 are in the locked position shown in full line in FIG. 7. Pin 72 is extended through the wall of the outer casing and is suitably shaped to receive the same key which is used to wind up the spring 36. When the key is engaged with the extension of pin 72 and is rotated to rotate cam 70 in a counter-clockwise direction, with respect to the view of FIG. 7, lever 62 is rotated in a clockwise direction about its pivot point 64 to move tooth 66 out of locking engagement with respect to gear 30, permitting drive spring 36 to unwind to thereby rotate the gear train and the electrical generator 56 as will be hereinafter described. After the spring 36 has unwound, biasing spring 68 forces lever 62 back into the latching position shown in full line in FIG. 7.

In order to limit the rotation of wind-up drum 26 in both a winding and an unwinding direction, cooperating stop means are provided on the drum 26 and on the upward vertical extension 24 about which drum 26 revolves. Vertical extension 24 is provided with a radially outwardly projecting stop element generally indicated at 76 including circumferentially spaced abutment surfaces 78 and 80 (FIG. 6) which respectively limit the rotation of drum 26 in a winding and an unwinding direction. The lower edge of drum 26 is cut away through an arc of approximately 180 degrees as indicated at 82, the opposite extremes of the cut-away portion of the drum being defined by abutment surfaces 84 and 86 which respectively engage the fixed abutment surfaces 78 and 80 when the drum 26 moves to its opposite extremes of travel in the winding or unwinding directions, respectively. The cut-away portion 82 of the drum straddles the fixed abutment or stop element 76, so that when the drum 26 is rotated in a winding direction, further motion of the drum in a winding direction is prevented when abutment surface 84 of the drum abuts against fixed abutment surface 78; and when spring 36 is released and unwinds, the limit of rotation in an unwinding direction is reached when abutment surface 86 of the drum abuts against fixed abutment surface 80. The angular travel of the drum in an unwinding direction required to reach fixed abutment surface 80 is such as to insure a complete unwinding of spring 36.

For most applications in which the spring-driven generator is used, when the generator is used as a "permissible" or "non-permissible" generator, it is important that the electrical output circuit of the generator not be closed until after the completion of a certain interval of rotation of the generator; and, as has been previously explained, in the "permissible" generator, it is also important that the electrical output of the generator be disconnected from the output circuit after a predetermined interval.

To accomplish the circuit closing and opening operation with the "permissible" type generator, and to accomplish the circuit closing operation with the "non-permissible" type generator, a switch means operated in timed relation to the unwinding rotation of the drum 26 is provided as part of the apparatus.

Thus, as best seen in the views of FIGS. 2 and 8 the underneath surface of gear 50 is provided with a cam-like switch operating surface 90 which cooperates with a microswitch or the like 92 carried by the housing section 11 adjacent the path of rotary movement of gear 50. The microswitch 92 comprises a pivoted operating lever 94 which carries a roller or cam follower 96 on the outer end thereof and is spring biased into the path of the rotating gear 50. The surface of gear 50 facing the follower element 96 on pivoted lever 94 is so contoured that during most of the rotation of gear 50, the pivoted switch operating lever 94 is permitted to move about its pivotal connection under the influence of its biasing spring to the circuit opening position of the switch. However, when the leading edge of cam surface 90 contacts the follower element 96 on the switch operating lever during the rotation of gear 50, the cam surface forces the pivoted lever 94 in a switch closing position and holds the switch in closed position until gear 50 has rotated sufficiently to rotate the cam surface beyond and out of contact with the pivoted switch lever.

In a generator of the "permissible" type, where it is desired to have the output circuit of the generator closed for only a short interval of time, such as 10 to 30 milliseconds, switch 92 is so located on the stationary supporting surface defined by housing section 11 and in the path of rotating gear 50 that, for example, cam surface 90 on the gear may first make contact with the follower element 96 on the pivoted switch lever 94 to close switch 92 after 120 degrees of unwinding rotation of the winding drum from its fully wound position, and the cam surface 90 may be so angularly dimensioned as to maintain the switch in a closed position for 15 degrees of rotation of the winding drum, after which the cam surface will move beyond cam follower 96 and permit the switch to open the circuit before winding drum 26 has fully completed its unwinding rotation, the drum continuing to rotate for an additional 15 degrees, for example, with the circuit open. In a "non-permissible" generator, switch 92 and cam 90 are so positioned relative to each other that the cam will close the switch circuit after 135 degrees of rotation of drum 26 in an unwinding direction, for example, and will maintain the switch in a closed position for the remainder of the rotation of drum 26 and also in the stopped position of drum 26, so that the output circuit of the generator will be closed not only to the end of the rotation of the drum, but also for the additional period during which generator 56 continues to rotate due to its own inertia after drum 26 has been brought to a stop, so that any electrical output of the generator as it rotates due to its own inertia will be connected to the output circuit.

As best seen in the views of FIGS. 2 and 7, the generator structure in the present embodiment comprises a magnetic field structure or stator including two spaced parallel core leg members 98 each respectively having a pole piece 100 adjacent the rotatable armature 57. The magnetic core structure also includes a cross yoke member 102 magnetically and structurally connected to the opposite legs 98, with a field winding 104 being positioned about yoke member 102. The rotating direct current armature or rotor 57 is provided with a commutator 59 having brushes 61 engaged therewith. The electrical output derived from brushes 61 is connected to the output terminals 106 of the generator, which are carried by one end of outer casing 16. The generator field structure is supported in assembled relation to the lower housing section 11 or gear casing by means of screws 108 which pass through lower wall 32 of the non-magnetic housing section 11, and which are received by threaded holes in the upper ends of the respective magnetic core legs 98. The mounting of the gear casing or lower housing section 11 directly onto the magnetic core legs 98 is possible only because housing section 11, like the rest of housing 10, is made of a nonmagnetic material such as aluminum.

The end of the armature shaft at the commutator end of the armature is supported by a suitable bearing carried by a non-magnetic bridging member 110 which spans the space between and is connected to the opposite spaced core legs 98. The opposite axial end of armature 57 is supported by a bearing passage in bearing bracket 52 which receives the end of stub shaft 54 of the generator armature.

While the electrical generator which forms part of the assembly would normally be a direct current generator, obviously if an alternating current output were desired, an alternating current generator could be substituted in place of the direct current generator hereinbefore described and illustrated. The terms "armature" or "rotor" as used in the claims are intended to cover the rotating member of a dynamoelectric machine, whether the dynamoelectric machine be a direct current generator or an alternating current generator. Similarly, the terms "stationary magnetic structure" or "stator" are intended to cover the stationary member of a dynamoelectric machine with respect to which the armature or rotor rotates, whether the dynamoelectric machine be a direct current generator or an alternating current generator.

The construction just described provides a compact assembly of the generator structure and the housing 10.

*Basic equations*

The following are some basic equations used in determining some of the relationships involved in the construction of the spring-driven generator:

(1) $$T = \frac{EbtR_3}{24} N S_f^2$$

(2) $$R_c = R_3 \left(1 + \frac{R_n}{R_3}\right)^{3/2}$$

(3) $$R_d = R_n + R_c$$

(4)
$$S_f = t\left(\frac{1}{R_n} + \frac{1}{R_3}\right)$$

(5)
$$\phi = \alpha \frac{R_n}{R_3}$$

Figure 1:
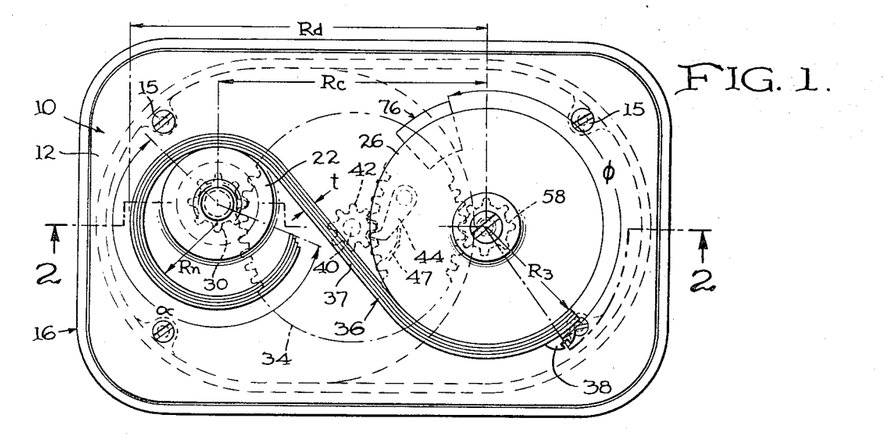
FIG. 1 is a top plan view of the spring-driven generator apparatus with the upper section of the outer casing thereof removed, and showing the drive spring in unwound condition.
Figure 2:
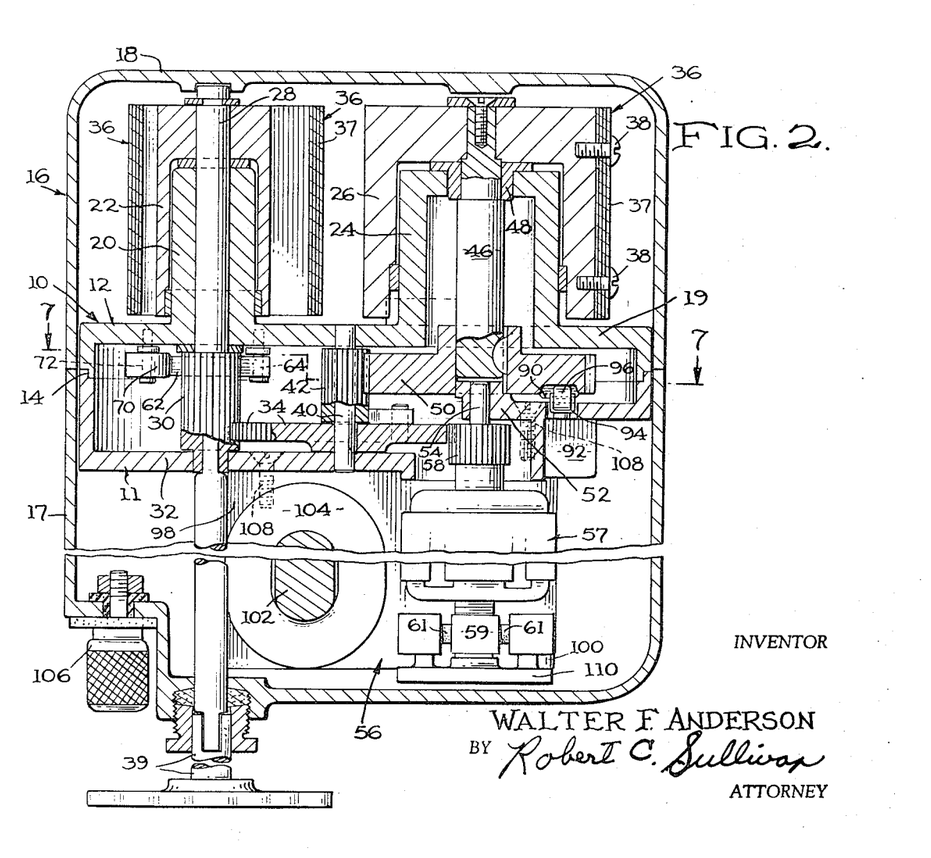
FIG. 2 is a view in vertical section along line 2—2 of FIG. 1.

The following is an explanation of the above symbols, some of which are shown on FIG. 1 of the drawings:

$T$=torque, lb.-in.
$E$=modulus, p.s.i.
$b$="RW" spring width, in.
$t$=thickness, in.
$R_n$=free coil (natural) radius, in.
$R_3$=winding drum radius, in.
$R_c$=optimum spacing, in., between center of winding drum and center of storage pin
$S_f$=stress factor
$N$=number of laminations
$R_d$=distance from output drum center to farthest point of spring on storage pin
$\phi$=deflection, degrees
$\alpha$=total angular travel of free coil

Summary of operation

In the operation of the spring-driven generator hereinbefore described, key 39 is engaged with the end of shaft 28 which is adapted to receive the key. Shaft 28 is manually rotated in the winding direction by means of the key to thereby rotate gear 30 which is fixed to shaft 28. Rotation of gear 30 in a winding direction causes rotation of gear 34 which is fixed to shaft 40. Gear 34 drives loosely mounted gear 42 through pawl 44 of overrunning clutch 43. Gear 42 drives gear 50 which is attached to shaft 46, and since an end of shaft 46 is rigidly secured to winding drum 26, the winding drum is rotated in a winding direction until abutment surface 84 at the lower edge of the winding drum with respect to the views of the drawings, abuts against abutment surface 78 of the stop element 76 at the base of vertical extension 24.

In the illustrated embodiment, due to the ratio between gears 30, 34, 42 and 50, it is necessary to rotate gear 30 by means of winding key 39 through a plurality of revolutions, such as 12 revolutions, for example, to rotate winding drum 26 through an angle such as 150 degrees. Reverse rotation of drum 26 in an unwinding direction is prevented by the detent mechanism shown in FIG. 7, including pivoted lever 62, tooth 66, and cam 70. When it is desired to release spring 36 to drive armature 57, key 39 is inserted into engagement with pin or shaft 72 on which cam 70 is mounted and shaft 72 is rotated in a counterclockwise direction with respect to the view shown in FIG. 7 to move lever 62 about its pivot point 64 to thereby disengage tooth 66 from its engagement with gear 30. The stored energy in spring 36 then causes spring 36 to rotate drum 26 in an unwinding direction. Rotation of drum 26 in an unwinding direction rotates shaft 46 and gear 50 which is fixed to shaft 46 to thereby rotate gear 42 in an unwinding direction. Gear 42 drives gear 34 through pawl 44 of overrunning clutch 43. Gear 34 is in meshing engagement with gear 58 on the end of generator shaft 54 and therefore drives gear 58 to cause rotation of armature 57 of electric generator 56 as spring 36 unwinds. Gear 34 is also in meshing engagement with gear 30 on shaft 28 and rotates gear 30 as gear 34 rotates. The rotation of gear 30 serves no function during the unwinding of spring 36. As spring 36 unwinds, it drives armature 57 of generator 56 with a constant torque, due to the zero gradient, constant torque characteristic of the spring.

After a predetermined angular rotation of drum 26, such as 120 degrees, for example, the cam surface 90 on the under surface of gear 50 will engage microswitch 92 to close the output circuit of the generator, and in a "permissible" type generator, the cam surface is so angularly dimensioned as to maintain switch 92 closed for a predetermined period of angular rotation of drum 26 and gear 50, such as 15 degrees, for example, after which cam surface 90 moves past the switch and permits the switch to open. After switch 92 of the permissible generator has opened, the drum continues to rotate through an additional angle, such as 15 degrees, for example, at which time abutment surface 86 on drum 26 engages abutment surface 80 on fixed stop element 76 carried by the base portion of vertical extension 24, to thereby prevent further rotary movement of drum 26. The relative positions of fixed and movable abutment surfaces 80 and 86 are such that spring 36 is substantially completely unwound when drum 26 is brought to a stop by the engagement of the abutment surfaces 80 and 86. However, although the drum has been brought to a complete stop, the generator armature 57 can continue to rotate because of its own rotary inertia, due to the provision of overrunning clutch 43 which permits gear 34 to continue rotating although loosely-mounted gear 42 which meshes with gear 50, has been brought to a complete stop. During the period of overrunning, gear 34 is rotated by gear 58 on the generator armature shaft, and pawl 44 of overrunning clutch 43 merely slips past the teeth of the stopped gear 42.

In the "permissible" type generator in which the cam surface 90 and the switch 92 are so located as to interrupt the output circuit of the generator before the drum 26 has stopped turning, there is no electrical output from the generator during the additional rotation after the drum has stopped. However, in a "non-permissible" type generator in which cam 90 and microswitch 92 are so related to each other that the switch is closed after 135 degrees of the 150 degree rotation of the drum, for example, and remains closed for the remainder of the rotation of the drum and after the drum has stopped, the additional rotary movement of the generator armature after the drum has stopped turning produces an electrical output which may be utilized and which provides a longer duration electrical output than is possible with the "permissible" type of generator.

While the embodiment of the spring-operated electrical generating apparatus described hereinbefore and shown in the drawings includes a rotatable drum about which the spring strip having the preset curvature is wound in a direction reversely of the direction in which the spring strip naturally tends to coil, with the reversely wound spring being guided and oriented by a stationary storage pin, it is also within the scope of this invention to instead provide a stationary drum member and a pivotally or rotatably mounted storage pin in the manner shown in FIG. 7 of the aforementioned United States Patent 3,047,280, issued to Charles Pernetta on July 31, 1962.

In the construction shown in FIG. 7 of Patent 3,047,-280, one end of the spring is secured to the stationary drum, and the storage pin is carried by a lever member which is pivotally mounted on the stationary drum, in such manner that pivotal movement in one direction of the lever which carries the storage pin causes the spring to be wound about the stationary drum in a direction reversely of its preset curvature due to engagement of the pin with the spring; and when the wound spring is released, it delivers a constant torque to the pivotally movable lever which causes the lever to move in the unwinding direction about its pivotal support. The lever shown in FIG. 7 of Patent 3,047,280 may be connected to the generator rotor through a suitable gear train including an overrunning clutch, in the manner hereinbefore described, so that unwinding action of the spring causes rotation of the generator rotor. The spring could also be wound up through the gear train and held in wound position by a suitable releasable detent means in the manner described hereinbefore, and cam means driven by the unwinding spring could be provided to control the opening and/or closing of the electrical output circuit of the generator as described hereinbefore.

It can be seen from the foregoing that there has been provided in accordance with this invention a spring-driven generator which has many advantages over the manually operated generators and over the spring-driven generators of the prior art. The zero gradient constant torque spring used as the prime mover for the generator is subject to a minimum of deterioration with the passage of time and with continued use and provides a substantially uniform and definitely predictable power output characteristic over a long operating life, insuring substantially constant output torque on each cycle of operation. The constant torque spring avoids the hammer-like starting impact associated with prior art spring driven generators which may cause breakage of the components of the generator assembly. Due to its laminated construction and the fact that one of its ends is freely movable, the zero gradient constant torque spring is much less subject to stresses which cause mechanical failure than drive springs of prior art short duration output electrical generators, and is not adversely affected by extremes in temperature as are prior art drive springs. Furthermore, while breakage of a prior art drive spring completely disables the spring as a prime mover, breakage of one of the plurality of laminations of the zero gradient constant torque spring still permits continued operation of the spring as a prime mover. The zero gradient constant torque spring may be wound up long in advance of use and does not develop a "set" as frequently occurs when prior art spring drives remain in wound-up condition for any substantial length of time. The constant torque spring drive also has definitely predictable time characteristics during the unwinding thereof which insures interruption of the output circuit at definitely predictable times, as is required in "permissible" type generators.

The zero gradient constant torque spring has the further advantages that for a given power output, it is much more compact than drive springs of the prior art, and that the power output of the spring may be easily adjusted at the time of manufacture by suitably selecting the number of laminations, since the power output is directly proportional to the number of laminations.

Further features of the construction which cooperate to provide an effective short duration electrical output generator include the cooperating cam and switch means which control the connection of the electrical output of the generator to the output circuit, the overrunning clutch which permits the generator to rotate under its own inertia after the winding drum has been brought to a stop, and the compact structural connection of the generator and its field structure to the gear casing.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. An electrical generating apparatus comprising an electrical generator including a rotatable armature and a stationary magnetic structure, a substantially zero gradient constant torque spring means for rotatably driving said armature comprising a spring member having a preset curvature but adapted to be wound reversely to its preset curvature, means for winding said spring member reversely to its preset curvature, means for releasing the wound spring member, and means transmitting the force of the unwinding spring member to said rotatable armature whereby to rotate said armature.

2. An electrical generating apparatus comprising an electrical generator including a rotor and a stator, a substantially zero gradient, constant torque spring means for rotatably driving said rotor, comprising a spring member having a preset curvature but adapted to be wound reversely to its preset curvature, means for winding said spring member reversely to its preset curvature, a detent means for preventing unintended unwinding action of said spring member, means for releasing said detent means whereby to release said spring member for unwinding, and means transmitting the force of the unwinding spring member to said rotor whereby to rotate said rotor.

3. An electrical generating apparatus comprising an electrical generator including a rotor and a stator, a substantially zero gradient constant torque spring means for rotatably driving said rotor comprising a spring member having a preset curvature but adapted to be wound reversely to its preset curvature, means for winding said spring member in a direction reversely of its preset curvature, means for releasing the wound spring member, a gear train connected between said spring member and said rotor, an overrunning clutch connected in said gear train, said overrunning clutch being effective to transmit movement from said spring member to said rotor in an unwinding direction of said spring member but permitting rotation of said rotor independently of said spring member after said spring member has substantially completely unwound.

4. An electrical generating apparatus comprising an electrical generator including a rotor and a stator, a substantially zero gradient, constant torque spring means for rotatably driving said rotor, comprising a spring member having a preset curvature but adapted to be wound reversely to its preset curvature, means for winding said spring member reversely to its preset curvature, a detent means for preventing unintended unwinding action of said spring member, means for releasing said detent means whereby to release said spring member for unwinding, switch means for controlling the energization condition of the output circuit of said generator, switch operating means driven by said spring member in synchronization with the rotational position of said spring member whereby to control the operation of said switch means in synchronization with the rotational position of said spring member, and effective to connect the generator to the output circuit after a first predetermined interval of operation and to disconnect the generator from the output circuit after a second predetermined interval of operation and means transmitting the force of the unwinding spring member to said rotor whereby to rotate said rotor.

5. An electrical generator apparatus comprising an electrical generator including a rotor and a stator, a housing, a winding drum supported for rotation by said housing, a substantially zero gradient constant torque spring means for rotatably driving said rotor, comprising a spring member having a preset curvature but adapted to be wound reversely to its preset curvature, one end of said spring member being secured to said winding drum, means for rotating said winding drum to wind said spring member about said drum in a direction reversely to the preset curvature of said spring member, means for releasing the wound spring member from its wound-up condition, and means connecting said drum to said rotor whereby rotation of said drum in an unwinding direction produces rotation of said rotor.

6. An electrical generating apparatus comprising an electrical generator including a rotor and a stator, a housing, a winding drum supported for rotation by said housing, a substantially zero gradient constant torque spring means for rotatably driving said rotor, comprising a spring member having a preset curvature but adapted to be wound reversely to its preset curvature, one end of said spring member being secured to said winding drum, means for rotating said winding drum to wind said spring member about said drum in a direction reversely to the preset curvature of said spring member, means for limiting the rotation of said winding drum in both winding and unwinding directions, means for releasing the wound spring member from its wound-up condition, and means connecting said drum to said rotor whereby rotation of said drum in an unwinding direction produces rotation of said rotor.

7. An electrical generating apparatus comprising an electrical generator including a rotor and a stator, a substantially zero gradient constant torque spring means for rotatably driving said rotor comprising a spring member having a preset curvature but adapted to be wound reversely to its preset curvature, a winding drum, one end of said spring member being secured to said winding drum, means for rotating said winding drum to wind said spring member about said drum in a direction reversely of the preset curvature of said spring member, means for limiting the rotation of said winding drum in both winding and unwinding directions, means for releasing the wound spring member from its wound-up condition, a gear train connected between said spring member and said rotor, an overrunning clutch connected in said gear train, said overrunning clutch being effective to transmit movement from said spring member to said rotor in an unwinding direction of said spring, but permitting rotation of said rotor independently of said spring member after said winding drum has reached the limit of its rotation in an unwinding direction.

8. An electrical generating apparatus comprising an electrical generator including a rotor and a stator, a substantially zero gradient constant torque spring means for rotatably driving said rotor comprising a spring member having a preset curvature but adapted to be wound reversely to its preset curvature, a winding drum, one end of said spring member being secured to said winding drum, means for rotating said winding drum to wind said spring member about said drum in a direction reversely of the preset curvature of said spring member, means for limiting the rotation of said winding drum in both winding and unwinding directions, means for releasing the wound spring member from its woundup condition, a gear train connected between said spring member and said rotor, an overrunning clutch connected in said gear train, said overrunning clutch being effective to transmit movement from said spring member to said rotor in an unwinding direction of said spring member, but permitting rotation of said rotor independently of said spring member after said winding drum has reached the limit of its rotation in an unwinding direction, switch means for controlling the energization condition of the output circuit of said generator, and switch operating means driven by said spring member in synchronization with the rotational position of said spring member whereby to control the operation of said switch means in synchronization with the rotational position of said spring member, and effective to connect the generator to the output circuit after a first predetermined interval of operation and to disconnect the generator from the output circuit after a second predetermined interval of operation.

9. An electrical generating apparatus including a rotor and a stator, a housing, a winding drum supported for rotation by said housing, a storage pin supported by said housing in spaced relation to said winding drum, a substantially zero gradient, constant torque spring means for rotatably driving said rotor, comprising a spring having a preset curvature but adapted to be wound reversely to its preset curvature, one end of said spring being fixed to said winding drum, the opposite end of said spring being free and extending about said storage pin, means for rotating said drum to wind said spring about said drum reversely to the preset curvature of said spring with the free end of said spring still extending about said storage pin, means for releasing the wound spring, and means connecting said drum to said rotor whereby rotation of said drum in an unwinding direction produces rotation of said rotor.

10. An electrical generating apparatus comprising an electrical generator including a rotor and a stator, a substantially zero gradient, constant torque spring means for rotatably driving said rotor comprising a spring member having a preset curvature but adapted to be wound reversely to its preset curvature, a winding drum, one end of said spring member being secured to said winding drum, a storage pin positioned in spaced relation to said winding drum, the opposite end of said spring member being free and extending about said storage pin, means for rotating said winding drum to wind said spring member about said drum in a direction reversely of the preset curvature of said spring member, means for limiting the rotation of said winding drum in both winding and unwinding directions, means for releasing the spring member from its wound-up condition, a gear train connected between said spring member and said rotor member, an overrunning clutch connected in said gear train, said overrunning clutch being effective to transmit movement from said spring member to said rotor in an unwinding direction of said spring member, but permitting rotation of said rotor independently of said spring member after said winding drum has reached the limit of its rotation in an unwinding direction.

11. An electrical generating apparatus comprising an electrical generator including a rotor and a stator, a substantially zero gradient, constant torque spring means for rotatably driving said rotor comprising a spring member having a preset curvature but adapted to be wound reversely to its preset curvature, a winding drum, one end of said spring member being secured to said winding drum, a storage pin supported by said apparatus in spaced relation to said winding drum to guide and orient the opposite end of said spring member, the opposite end of said spring member being free and extending about said storage pin, means for rotating said winding drum to wind said spring member about said drum in a direction reversely of the preset curvature of said spring member, means for limiting the rotation of said winding drum in both winding and unwinding directions, means for releasing the spring member from its wound-up condition, a gear train connected between said spring member and said rotor, an overrunning clutch connected in said gear train, said overrunning clutch being effective to transmit movement from said spring member to said rotor in an unwinding direction of said spring member, but permitting rotation of said rotor independently of said spring member after said winding drum has reached the limit of its rotation in an unwinding direction, switch means for controlling the energization condition of the output circuit of said generator, and switch operating means driven by said spring member in synchronization with the rotational position of said spring member whereby to control the operation of said switch means in synchronization with the rotational position of said spring member, and effective to connect the generator to the output circuit after a first predetermined interval of operation and to disconnect the generator from the output circuit after a second predetermined interval of operation.

12. An electrical generating apparatus including a rotor and a stator, a housing, a drum element suported by said housing, a storage pin element supported by said housing in spaced relation to said drum element, a substantially zero gradient, constant torque spring means for rotatably driving said rotor, comprising a spring having a preset curvature but adapted to be wound reversely to its preset curvature, one end of said spring being fixed to said drum element, the opposite end of said spring being free and extending about said storage pin element, one of said elements being mounted for rotation, means for winding said spring about said drum element reversely to the preset curvature of said spring with the free end of said spring extending about said storage pin element, means for releasing the wound spring, and means connecting one of said elements to said rotor whereby rotation of said one element in an unwinding direction produces rotation of said rotor.

13. An electrical generating apparatus comprising an electrical generator including a rotor and a stator, a substantially zero gradient, constant torque spring means for rotatably driving said rotor, comprising at least one laminar leaf of prestressed spring strip, said laminar leaf being adapted to be wound reversely to the direction in which it normally tends to coil, means for winding said laminar leaf in a direction reversely to the direction in which it normally tends to coil, means for releasing the wound laminar leaf, and means transmitting the force of the unwinding laminar leaf to said rotor member whereby to rotate said rotor member.

14. An electrical generating apparatus comprising an electrical generator including a rotor and a stator, a substantially zero gradient, constant torque spring means for rotatably driving said rotor, comprising at least one laminar leaf of prestressed spring strip, said laminar leaf being adapted to be wound reversely to the direction in which it normally tends to coil, means for winding said laminar leaf reversely to the direction in which it normally tends to coil through not more than one complete revolution of said laminar leaf, means for releasing the wound laminar leaf, and means transmitting the force of the unwinding laminar leaf to said rotor whereby to rotate said rotor.

15. An electrical generating apparatus comprising an electrical generator including a rotor and a stator, a substantially zero gradient, constant torque spring means for rotatably driving said rotor, comprising at least one laminar leaf of prestressed spring strip, said laminar leaf being adapted to be wound reversely to the direction in which it normally tends to coil, a drum element, one end of said laminar leaf being secured to said drum element, means for winding said laminar leaf about said drum element in a direction reversely of the direction in which said lamnar leaf normally tends to coil, a storage pin element suported by said apparatus in spaced relation to said drum element, the opposite end of said laminar leaf being free and extending about said storage pin element, one of said elements being mounted for rotation and the other of said elements being stationary, means for releasing the wound laminar leaf for unwinding to thereby permit the unwinding laminar leaf to rotate the rotatable one of said elements, and means connecting the rotatable one of said elements to said rotor whereby unwinding movement of said spring produces rotation of said rotor.

16. An electrical generating apparatus comprising an electrical generator including a rotor and a stator, a substantially zero gradient, constant torque spring means for rotatably driving said rotor, comprising a plurality of laminar leaves of prestressed spring strip positioned in superposed relation to each other, said laminar leaves being adapted to be wound reversely to the direction in which they normally tend to coil, a drum element, a corresponding end of each of the plurality of laminar leaves being secured to said drum element, the remaining length of each laminar leaf being free to slidably move relative to the other laminar leaves, means for winding said laminar leaves about said drum element in a direction reversely of the direction in which said laminar leaves normally tend to cool, a storage pin element supported by said apparatus in spaced relation to said drum element, the opposite end of each laminar leaf being free and extending about said storage pin element, one of said elements being mounted for rotation and the other of said elements being stationary, means for releasing the wound laminar leaves from their wound condition to thereby permit the unwinding laminar leaves to rotate the rotatable one of said elements, and means connecting the rotatable one of said elements to said rotor whereby unwinding movement of said spring produces rotation of said rotor.

17. An electrical generating apparatus comprising an electrical generator including a rotor and a stator, a substantially zero gradient, constant torque spring means for rotatably driving said rotor, comprising a plurality of laminar leaves of prestressed spring strip positioned in superposed relation to each other, said laminar leaves being adapted to be wound reversely to the direction in which they normally tend to coil, a winding drum, a corresponding end of each of the plurality of laminar leaves being secured to said winding drum, the remaining length of each laminar leaf being free to slidably move relative to the other laminar leaves, means for rotating said winding drum to wind said laminar leaves about said drum in a direction reversely of the direction in which said laminar leaves normally tend to coil, a storage pin supported by said apparatus in spaced relation to said winding drum, the opposite end of each laminar leaf being free and extending about said storage pin, means for releasing the wound laminar leaves from their wound condition to thereby permit the unwinding laminar leaves to rotate said winding drum, and means connecting said drum to said rotor whereby rotation of said drum in an unwinding direction produces rotation of said rotor.

18. An electrical generating apparatus comprising an electrical generator including a rotor and a stator, a substantially zero gradient, constant torque spring means for rotatably driving said rotor comprising a spring member of strip metal having a preset curvatue but adapted to be wound reversely to its preset curvature, means for winding said spring member in a direction reversely to its preset curvature through not more than one complete revolution of said spring member, means for releasing the wound spring member to permit unwinding thereof, and means transmitting the force of the unwinding spring member to said rotor whereby to rotate said rotor.

19. An electrical generating apparatus comprising an electrical generator including a rotor and a stator, a substantially zero gradient constant torque spring means for rotatably driving said rotor comprising a spring member of strip metal having a preset curvature but adapted to be wound reversely to its preset curvature, means for winding said spring member in a direction reversely to its preset curvature through not more than one complete revolution of said spring member, a detent means for preventing unintended unwinding action of said spring member, means for releasing said detent means whereby to release said spring member for unwinding, a gear train connected between said spring member and said rotor for transmitting the force of the unwinding spring member to said rotor whereby to rotate said rotor, and an overrunning clutch connected in said gear train, said overrunning clutch being effective to transmit movement from said spring member to said rotor in an unwinding direction of said spring member but permitting rotation of said rotor independently of said spring member after said spring member has substantially completely unwound.

20. An electrical generating apparatus comprising an electrical generator including a rotor and a stator, a substantially zero gradient constant torque spring means for rotatably driving said rotor comprising a spring member of strip metal having a preset curvature but adapted to be wound reversely to its preset curvature, means for winding said spring member in a direction reversely to its preset curvature through not more than one complete revolution of said spring member, a detent means for preventing unintended unwinding action of said spring member, means for releasing said detent means whereby to release said spring member for unwinding, a gear train connected between said spring member and said rotor for transmitting the force of the unwinding spring member to said rotor whereby to rotate said rotor, an overrunning clutch connected in said gear train, said overrunning clutch being effective to transmit movement from said spring member to said rotor in an unwinding direction of said spring member but permitting rotation of said rotor independently of said spring member after said spring member has substantially completely unwound, switch means for controlling the energization condition of the output circuit of said generator, and switch operating means driven by said spring member in synchronization with the rotational position of said spring member whereby to control the operation of said switch means in synchronization with the rotational position of said spring member, and effective to connect the generator to the output circuit after a first predetermined interval of operation and to disconnect the generator from the output circuit after a second predetermined interval of operation.

References Cited

UNITED STATES PATENTS

| 1,479,152 | 1/1924 | Myers | 290—1 |
| 2,192,542 | 3/1940 | Benedetti | 290—1 X |
| 2,835,344 | 5/1958 | Allen | 185—37 |
| 3,151,704 | 10/1964 | Clarke | 135—37 |
| 3,209,863 | 10/1963 | Dalton | 135—9 X |
| 3,216,528 | 11/1965 | Lohr | 135—37 |
| 3,216,529 | 11/1965 | Lohr | 135—37 |

ORIS L. RADER, *Primary Examiner.*

G. R. SIMMONS, *Assistant Examiner.*